O. A. GALLATIN.
COMBINED ROLLER, HARROW, AND CULTIVATOR.
APPLICATION FILED SEPT. 25, 1908.
922,469.
Patented May 25, 1909.
2 SHEETS—SHEET 1.
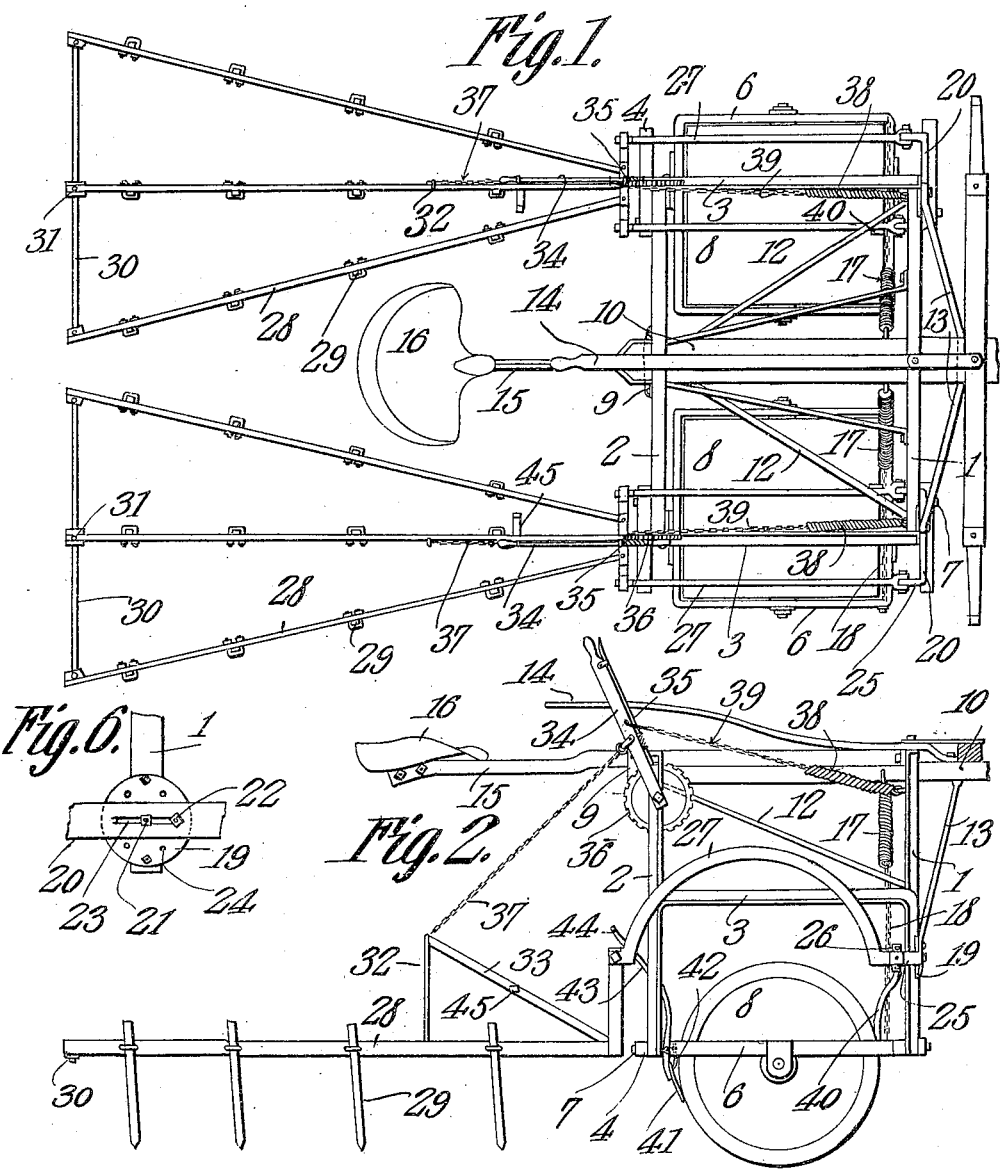

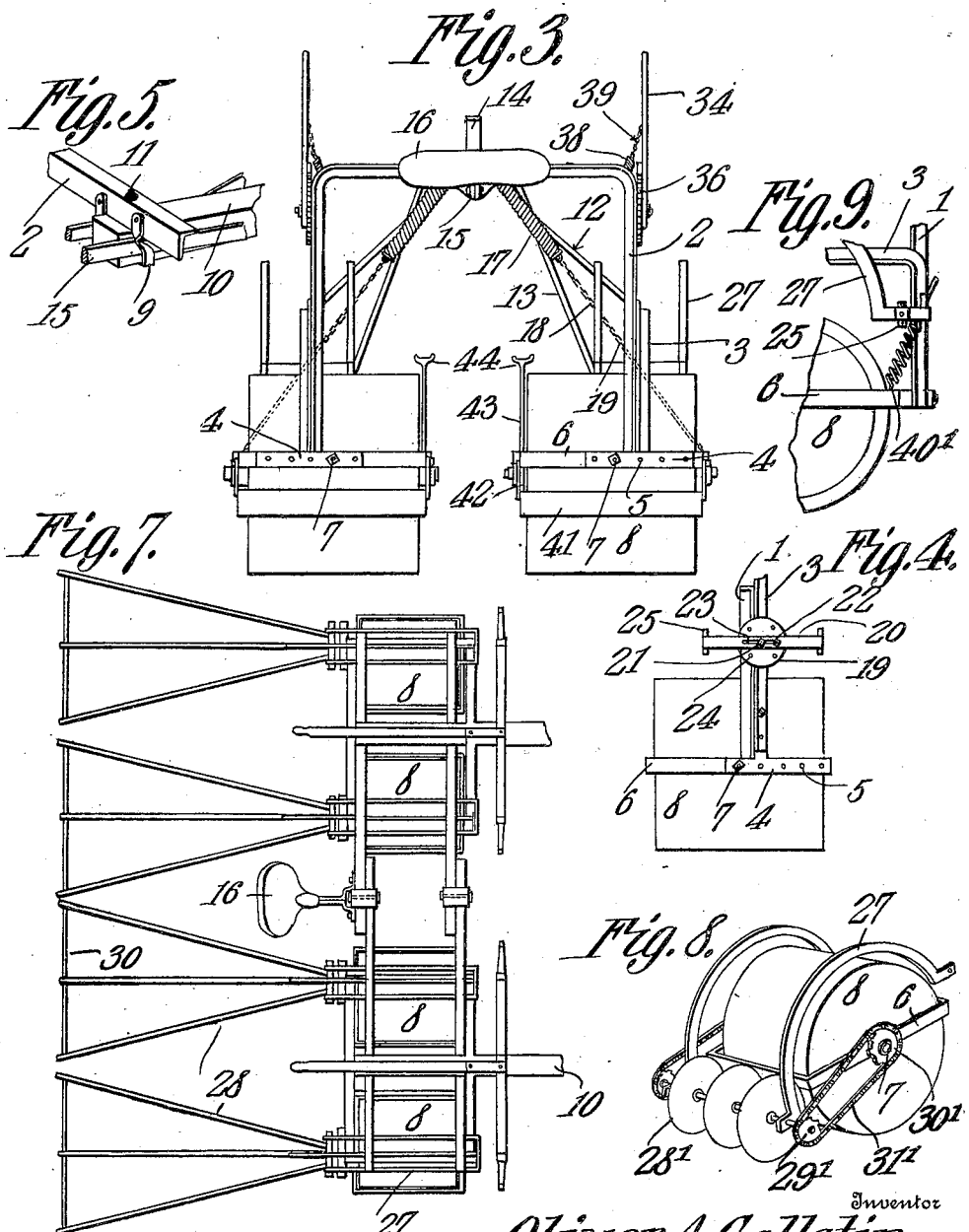

UNITED STATES PATENT OFFICE.

OLIVER A. GALLATIN, OF ASHLAND, NEBRASKA, ASSIGNOR TO FARMERS PLOW COMPANY, OF ASHLAND, NEBRASKA.

COMBINED ROLLER, HARROW, AND CULTIVATOR.

No. 922,469.  Specification of Letters Patent.  Patented May 25, 1909.

Application filed September 25, 1908. Serial No. 454,784.

*To all whom it may concern:*

Be it known that I, OLIVER A. GALLATIN, a citizen of the United States, residing at Ashland, in the county of Saunders and State of Nebraska, have invented a new and useful Improvement in Combined Rollers, Harrows, and Cultivators, of which the following is a specification.

This invention has relation to combined rollers, harrows and cultivators and it consists in the novel construction and arrangement of its parts hereinafter shown and described.

The implement is especially designed to be used for cultivating young corn by rolling and harrowing the ground between the rows of growing plants.

In the cultivation of young corn it is customary to roll the ground between the rows and then harrow it, and, unless the harrow immediately follows the roller, the ground is liable to bake, or to form a hard crust, especially so if rain intervenes, and, in such event, when the harrow is used the crust is broken into clods which frequently destroy the plants. When the harrow immediately follows the roller, it results, not only in more effectually destroying the weeds, but also leaves the earth between the rows soft and mellow. It is advantageous, therefore, to combine the roller and harrow, so that the two operations may be performed substantially at the same time, and it is the purpose of the present invention to form this combination in such manner as to be most effective, and to provide for readily and conveniently throwing the harrow out of operation without requiring the operator to leave his seat.

With the above objects in view the implement consists primarily in a frame to which are pivotally attached roller frames, which may tilt laterally with relation to the frame. Rollers are journaled for rotation in the said roller frames and also serve as supports for the main frame. Springs are interposed between the main frame and the roller frames and are under tension with a tendency to hold the inner ends of the rollers firmly against the work they are to perform. Arched draft bars are pivotally connected at their forward ends with the main frame and extend rearwardly over the rollers, and the harrow or cultivating members are connected with the said draft bars. Means are provided for holding the draft bars in predetermined relations with the roller frames and the harrow or cultivating members are pivotally connected with the rear ends of the said draft bars. Levers are mounted upon the main frame and are operatively connected with the harrow or cultivating members, and springs are attached with the main frame and are connected at their rear ends with the said levers and are under tension with a tendency to lift the harrow or cultivating members. A draft tongue is pivotally connected with the main frame and a lever mechanism is provided for swinging the said tongue laterally.

In the accompanying drawings:—Figure 1 is a top plan view of the implement. Fig. 2 is a side elevation of the same. Fig. 3 is a rear end view of the same. Fig. 4 is a front elevation of one of the rollers of the implement. Fig. 5 is a detailed perspective view showing the manner in which the tongue is pivotally connected with the frame of the implement. Fig. 6 is an enlarged detailed view, showing the manner in which the cross-bars are connected with the frame of the implement. Fig. 7 is a plan view, showing two of the implements coupled together. Fig. 8 is a perspective view of one of the rollers of the implement, showing a modified form of trailing members attached thereto. Fig. 9 is a side elevation of a portion of the implement showing a modified form of the same.

The main frame of the implement consists of the forward arch bar 1 and the rearward arch bar 2. The said arch bars 1 and 2 are connected together at their lower end portions by the side arch bars 3. The blocks 4 are mounted at the lower ends of the arch bars 1 and 2, and each block is provided with a series of perforations 5. The blocks 4 are laterally disposed with relation to the lower ends of the respective arch bars to which they are connected. The forward and rear ends of the roller frames 6 are provided with the pivot bolts 7 which are adapted to be inserted through the perforations 5 of the blocks 4. A roller 8 is journaled for rotation in each of the frames 6. Thus it will be seen that by removing the bolts 7 the roller frames 6 and the rollers 8 may be adjusted laterally with relation to the main frame of the implement, and, when properly positioned, the said frames may be secured thereat by passing the bolts 7 through the registering perforations 5 of the blocks 4.

The U-shaped clip or support 9 is attached to the rear arch beam 2 and the rear end of the draft tongue 10 is pivotally mounted between the intermediate portion of the said clip 9 and the middle of the said arch bar 2. The bolt 11 passes transversely through the said arch bar and the tongue 10 and serves as a pivot for the latter. The braces 12 extend from the intermediate portion of the rear arch bar 2 to the vertical or leg portions of the front arch bar 1. The ends of the inverted U-shaped guides 13 are secured to the leg portions of the front arch bar 1, and the intermediate portion of the said guide 13 lies under the rear portion of the tongue 10 in the vicinity of the intermediate portion of the front arch bar 1, and serves as a guide upon which the said tongue 10 may swing laterally. The lever 14 is fulcrumed to the middle of the front arch bar 1 and is pivotally connected at its forward end to the tongue 10. The rear end portion of the said lever 14 is disposed transversely over the intermediate portion of the rear arch bar 2. It is obvious that by swinging the rear end of the lever 14 the tongue 10 may be swung laterally, or, when the draft animals are hitched to the tongue, the said tongue will be held stationary and the main frame of the implement will be swung laterally, whereby the rollers 8 may be guided in their courses.

The seat bars 15 are attached at their forward ends to the intermediate portion of the front arch bar 1 and extend back transversely under the intermediate portion of the rear arch bar 2 and lie within the clips 9. The seat 16 is mounted upon the rear end portions of the said seat bars 15. The rear end of the lever 14 extends to within ready reach of one occupying the seat 16. The upper inner ends of the springs 17 connect with the tongue 10, and the lower ends of the said springs connect with the chains 18, the lower ends of which are attached to the outer portions of the roller frames 6. The springs 17 are under tension with a tendency to elevate the outer portions of the said roller frames 6, and thus the said rollers are especially adapted to operate against the sides of furrows in inclined positions.

The disks 19 are mounted upon the lower forward portions of the legs of the front arch bar 1, and cross-bars 20 are pivotally mounted upon the said disks 19. In addition to being provided with the pivot bolt 21, the parts 19 and 20 also are supplied with an additional transversely disposed bolt 22, which may be passed through an elongated slot 23, provided in the cross-bar 20, and one of the series of perforations 24, provided in the disk 19. By such an arrangement, it is obvious that the bolt 22 may be dispensed with, when the bar 20 will be freely pivoted upon the bolt 21, but in case it is desired to fix the bar 20 at any desired angle with relation to the surface of the ground, the bolt 22 is passed through the slot 23 and one of the perforations 24. When the parts are so assembled the cross-bar 20 is fixed with relation to the disk 19. The end portions of the cross-bar 20 terminate in the rearwardly disposed T-shaped extremities 25. Each of the extremities 25 is provided with a series of vertically disposed perforations 26. The forward ends of the arch draft bars 27 are pivotally connected with the T-shaped extremities 25 of the cross-bars 20, and said draft bars extend back transversely over the rollers 8. Thus it will be seen that means are provided for adjustably attaching the forward end portion of the draft bar 27 with the cross-bar 20, and that the said draft bar 27 may swing vertically with relation to the said cross-bar.

The forward ends of the frames 28 are pivotally connected with the rear end of the draft bar 27. The said frames 28 are provided with harrow teeth 29, or, in lieu thereof, the said frames may be provided with standards and cultivator-shovels of approved pattern. The rear ends of the bars serving to make up the frames 28 are spaced apart by the cross-bars 30, which overlap each other at their intermediate portions, and which are adjustably held in fixed positions with relation to the longitudinal bars of the said frames by means of the set screw 31 and clamp, mounted upon the intermediate bar of the said frame 28. Thus means are provided for spreading or bringing together and holding in an adjusted position the longitudinally disposed bars of the frame 28. The standard 32 is erected upon each frame 28 and is held in an upright position by means of a brace 33. A lever 34 is fulcrumed upon the vertically disposed portions of the rear arch bar 2, and each lever 34 is provided with a pawl 35. A gear segment 36 is also mounted upon each of the vertical sides of the rear arch bar 2, and is adapted to be engaged by the pawl 35 of that lever pivotally mounted upon the said portion of the said arch bar. The chains 37 are connected at their upper ends with the lever 34, and the lower ends of the said chains are connected with the standards 32. The springs 38 are connected at their forward ends with the front arch bar 1, and are connected at their rear ends with the chains 39, the rear ends of which are attached to the lever 34. The springs 38 are under tension with a tendency to swing the upper or free end of the lever 34 toward the front arch bar 1. Thus lever mechanisms are provided for swinging the frames 28 vertically and in lifting the frames the tension of the springs 38 comes into play, and assists in the upward movement of the said frames. The stay-bars 40 are connected at their lower ends with the roller frames 6, and at their upper ends are connected with the forward end portions of the inner draft bar 27. Thus means are provided for fixing the roller frames 6 with relation to the said draft bars 27. By this arrangement, the roller frames 6 may oscillate upon the bolts 7, but during such movement the draft bars 27 will have a corresponding vertical movement. The scrapers 41 are hingedly connected with the rear sides of the roller frames 6 and the springs 42 bear against the said scrapers and are attached at their upper portions to the rear sides of the said roller frames 6, and are under tension with a tendency to hold the scrapers 41 away from the peripheries of the rollers 8. The standards 43 are attached to the scrapers 41 and each standard is provided at its upper end with a foot-rest 44. The said foot-rests 44 are within convenient reach of one occupying the seat 16, and, when it is desired to free the peripheries of the rollers 8 of mud or other accumulation, the operator depresses the foot-rests 44 and the standards 43, whereby the lower free edges of the scrapers 41 are brought into contact with the peripheries of the said rollers 8, and the same are freed from accumulation. The frames 28 are also provided with foot-rests 45, whereby the operator may depress the said frames, so that the earth-engaging members carried thereby may enter, to a greater or less depth, into the surface of the soil. By such an arrangement it will be seen that an implement is provided which is adapted especially to be used for rolling and cultivating the soil between rows of growing plants, and that, substantially simultaneous with the rolling operation, the soil is harrowed or cultivated. It will also be seen that the rollers 8 may be inclined downwardly toward each other at their inner ends, and thus the said rollers may be caused to evenly pack the soil at the sides of the furrows, and that as the said rollers 8 tilt laterally the draft bars 27 have similar movement, which causes the frame 28 to assume inclined positions, whereby the earth-engaging members carried thereby may effectually operate upon the rolled sides of the furrows. It will also be seen that by providing the lever mechanism for swinging the main frame laterally with relation to the draft tongue, that the rollers may be guided, to a nicety, along the standing rows of plants, and that they may operate upon the soil in close proximity to the plants. It will also be seen that means are provided for adjusting the rollers 8 laterally with relation to each other, whereby the space between the rows of plants may be covered, even should the distance between the rows vary.

In the modified form of the implement as illustrated in Fig. 9 the stay bar 40 is dispensed with and a spring 40' is used in its stead.

In the construction shown in Fig. 8, the disks 28' are mounted upon a shaft which is journaled in the bars 27 and which are rotated by the sprocket wheels 29' and 30' and the chain 31'.

Having described my invention, what I claim as new, and desire to secure, by Letters Patent, is:—

1. An implement as described comprising a main frame consisting of front and rear arch bars, side arch bars attached to the extremities of the front and rear arch bars, roller frames pivotally mounted between the front and rear arch bars, rollers journaled in said roller frames, and springs connected at their upper ends with fixed portions of the frame and at their lower ends with the outer portions of the said roller frames.

2. An implement as described comprising a main frame, roller frames pivotally connected with the said main frame, rollers journaled in the roller frames, cross-bars pivotally attached to the forward portion of the main frame, draft bars pivotally connected to the ends of the cross-bars and lying transversely over the rollers, and trailing frames pivotally connected at their forward ends with the draft bars and carrying earth-engaging members.

3. An implement as described comprising a main frame, roller frames pivotally mounted in the main frame, rollers journaled for rotation in the roller frames, cross-bars pivotally connected with the forward portions of the main frame, arched draft-bars pivotally connected at their forward ends with the cross-bars and lying transversely over the rollers, and earth-engaging members connected with the rear portions of the said draft bars.

4. An implement as described comprising a main frame, roller frames pivotally mounted in the main frame, rollers journaled for rotation in the roller frames, cross-bars pivotally connected with the forward portion of the main frame and having at their extremities rearwardly disposed T-shaped portions, arch-bars pivotally and adjustably connected with the T-shaped extremities of the said cross-bars, and earth-engaging members connected with the rear portions of the said draft-bars.

5. An implement as described comprising a main frame, roller frames pivotally attached to the main frame, rollers journaled for rotation in the roller frames, cross-bars pivotally connected with the forward portion of the main frame, draft-bars pivotally connected at their forward ends with the cross-bars, stay-bars connecting the said roller frames and the draft-bars together and earth-engaging members carried by the rear portions of the said draft-bars.

6. An implement as described comprising a main frame, roller frames pivotally connected with the main frame, rollers journaled for rotation in the roller frames, cross-bars pivotally connected with the forward portion of the main frame, said cross-bars having their ends terminating into rearwardly disposed T-shaped extremities, arched draft-bars pivotally connected at their forward ends with the T-shaped extremities of the cross-bars, means for connecting the roller frames and the draft-bars together, and earth-engaging members carried by the rear portions of the said draft-bars.

In testimony that I claim the foregoing as my own, I have hereto affixed my signature in the presence of two witnesses.

OLIVER A. GALLATIN.

Witnesses:
L. H. LYLE,
E. E. LYLE.